United States Patent [19]

Araki et al.

[11] Patent Number: 4,907,850
[45] Date of Patent: Mar. 13, 1990

[54] APPARATUS FOR PERIODICALLY GENERATING SECOND HARMONIC

[75] Inventors: Keisuke Araki, Tokyo; Kenichi Ohta, Yokohama, both of Japan

[73] Assignee: Canon Kabushiki Kaisha, Tokyo, Japan

[21] Appl. No.: 217,973

[22] Filed: Jul. 12, 1988

[30] Foreign Application Priority Data

Jul. 17, 1987 [JP] Japan ................. 62-179664
Jul. 20, 1987 [JP] Japan ................. 62-180798

[51] Int. Cl.$^4$ ............................. G02B 5/14
[52] U.S. Cl. .................. 350/96.13; 307/430
[58] Field of Search ........... 350/96.12, 96.13, 96.14, 350/96.15, 96.29, 96.30; 307/425-430

[56] References Cited

U.S. PATENT DOCUMENTS

| | | | |
|---|---|---|---|
| 3,584,230 | 6/1971 | Tien | 307/430 |
| 3,586,872 | 6/1971 | Tien | 307/430 |
| 3,624,406 | 11/1971 | Martin | 350/96.12 X |
| 3,831,038 | 8/1974 | Dabby et al. | 307/430 |
| 4,001,577 | 1/1977 | Albanese et al. | 250/199 |
| 4,236,785 | 12/1980 | Papuchon et al. | 350/96.14 |
| 4,767,169 | 8/1988 | Teng et al. | 350/96.12 X |

OTHER PUBLICATIONS

"Dependence of Second-Harmonic Phase-Matching Temperature in LiNb$O_3$ Crystals on Melt Composition", by Fay et al, Applied Physics Letters, 1 Feb. 1968, vol. 12, No. 3, pp. 89–91.

Primary Examiner—William L. Sikes
Assistant Examiner—Akm E. Ullah
Attorney, Agent, or Firm—Fitzpatrick Cella Harper & Scinto

[57] ABSTRACT

An apparatus for periodically generating a second harmonic light comprises: a light source; and means for converting a fundamental wavelength light emitted from said light source to a second harmonic light, including optical wave guide means having a light propagation area and means for periodically varying a refractive index of the light propagation area.

6 Claims, 5 Drawing Sheets

FIG.1
PRIOR ART
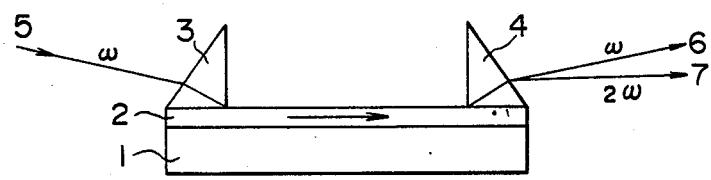
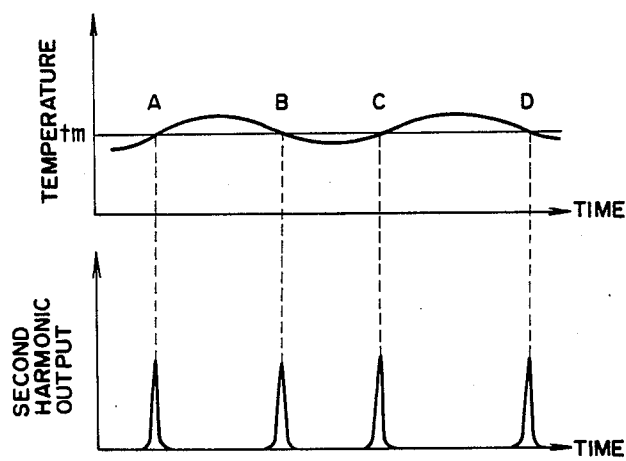
FIG.2A
FIG.2B

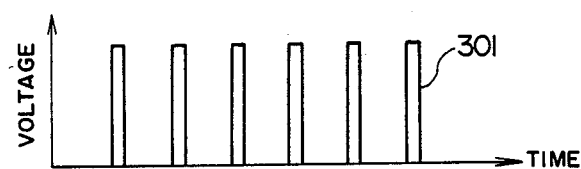
FIG.5A
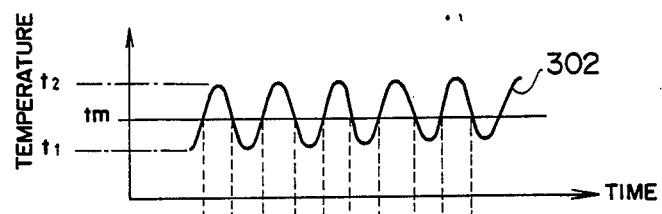
FIG.5B
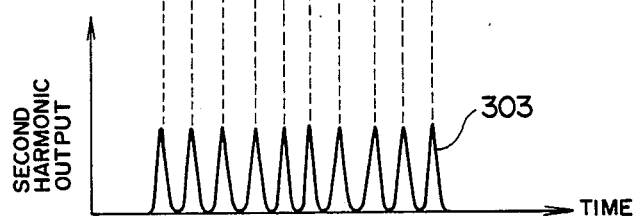
FIG.5C
FIG.6
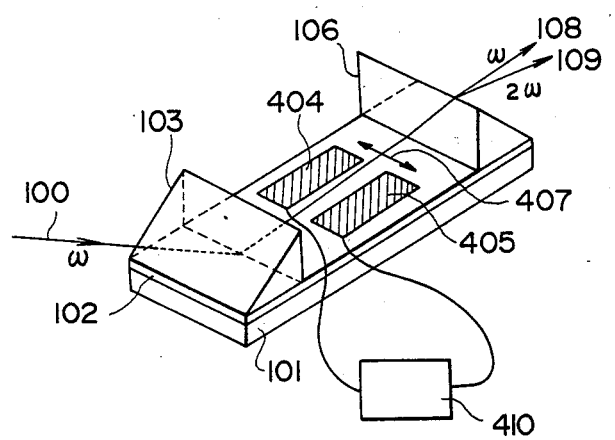

APPARATUS FOR PERIODICALLY GENERATING SECOND HARMONIC

BACKGROUND OF THE INVENTION

1. Field of the Invention

The present invention relates to a second harmonic generator, and more particularly to an apparatus for converting a fundamental wavelength light propagating in an optical wave guide to a second harmonic which efficiently propagates in the optical wave guide.

2. Related Background Art

A second harmonic generation (SHG) element which utilizes a non-linear optical effect has recently been developed for an optical wave guide. The SHG element converts a wavelength of a laser beam to one-half, and it converts an infrared ray to a visible ray or a visible ray to an ultraviolet ray. Accordingly, it has a great industrial value. In a band of 0.3–0.5 μm which is difficult to oscillate by a semiconductor laser alone, a 0.4 μm band coherent light is generated by a combination of a 0.8 μm band semiconductor laser and an SHG element so that an integration density of an optical memory and a precision of a scanner are enhanced.

In a known SHG element, a wave guide for confining a light is formed by a proton exchange method on a $LiNbO_3$ substrate having a large electro-optical effect FIG. 1 shows a schematic view of a conventional SHG element. Numeral 1 denotes an optical wave guide made of a non-linear crystal such as $LiNbO_3$, and numeral 2 denotes a high refractive index layer formed by a proton exchange method. Both an ω-light (fundamental wavelength light) and a 2ω-light (second harmonic light) are confined in this area. Numeral 3 denotes a prism coupler for coupling the ω-light to the wave guide 1, numeral 4 denotes a prism coupler for extracting the ω-light and the 2ω-light generated in the wave guide, numeral 5 denotes the ω-light directed to the prism coupler 3, and numerals 6 and 7 denote ω-light and 2ω-light emitted from the prism coupler 4, respectively.

In the SHG element, in order to efficiently convert the fundamental wavelength light (angular frequency ω) to the second harmonic light (angular frequency 2ω), it is necessary to set the phase velocities of the ω-wave and the 2ω-wave equal by phase matching. In the prior art optical wave guide, a mode diversity characteristic of the optical wave guide is utilized and the film thickness of the optical wave guide is controlled to make effective refractive indices for the ω-wave and 2ω-wave equal, or a temperature of a crystal is controlled to attain the phase matching.

However, the temperature control is very severe. As shown in FIGS. 2A and 2B, when the temperature is controlled with a target temperature tm (phase matching temperature), the second harmonic may not be generated for a long time period as shown by a period A-B because the second harmonic is generated only at the temperature tm. Accordingly, it has not yet been put into practical use.

SUMMARY OF THE INVENTION

It is an object of the present invention to provide a second harmonic light generator which attains phase matching without requiring severe control of parameters such as temperature, electric field and film thickness so that a second harmonic light is generated efficiently.

The above object of the present invention is achieved by a second harmonic generator comprising a light source, means for converting a fundamental wavelength light emitted from the light source to a second harmonic light, including optical wave guide means having a light propagation area and means for periodically changing a refractive index of the light propagation area.

BRIEF DESCRIPTION OF THE DRAWINGS

FIG. 1 shows a schematic view of a prior art SHG element,

FIGS. 2A and 2B show relationships between temperature and second harmonic output, FIGS. 5A, 5B and 5C show relationships between input voltage and temperature, and second harmonic output, FIG. 6 shows a second embodiment of the second harmonic generator of the present invention.

DETAILED DESCRIPTION OF THE PREFERRED EMBODIMENTS

Figure 3:
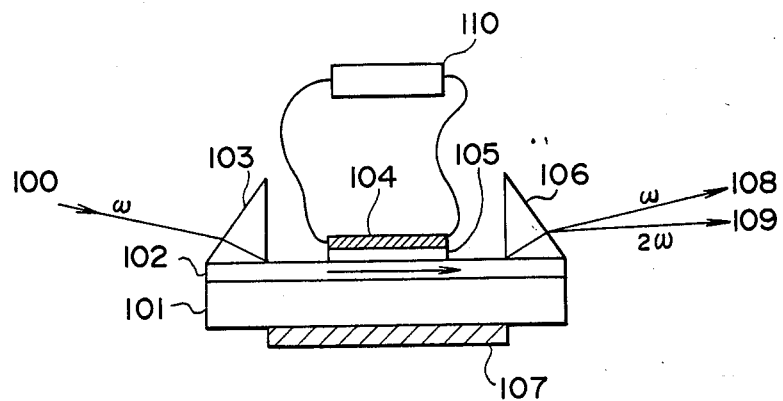
FIG. 3 shows a first embodiment of a second harmonic generator of the present invention.

FIG. 3 shows a sectional view of a first embodiment of a second harmonic generator of the present invention.

Numeral 101 denotes an optical wave guide made of a non-liner crystal such as $LiNbO_3$, and numeral 102 denotes a high refractive index layer formed by a proton exchange method. An ω-light (fundamental wavelength light) and a 2ω-light (second harmonic light) are confined in this area. Numeral 103 denotes a prism coupler for coupling the ω-light into the wave guide 101, numeral 104 denotes a resistive heating electrode, numeral 105 denotes a thin insulative layer made of $SiO_2$ for insulating the resistive heating electrode 104 from the wave guide 101, numeral 106 denotes a prism coupler for extracting the ω-light and the 2ω-light generated in the wave guide, numeral 107 denotes a heat sink metal film which is normally cooled to an appropriate temperature by a cooling device (not shown), numeral 100 denotes a light directed to the prism coupler 103, numerals 108 and 109 denote ω-light and 2ω-light emitted from the prism coupler 106, and numeral 110 denotes a power supply for heating the resistive heating electrode 104. It applies a periodic voltage to the electrode 104. In general, a refractive index of a material is temperature dependent. A refractive index n of the material at a temperature T is expressed by:

$$n = n_o + C(T - T_o) \quad (1)$$

where $n_o$ is a refractive index at a temperature $T_o$, and C is a temperature coefficient of the refractive index in a vicinity of $T_o$.

Figure 4:
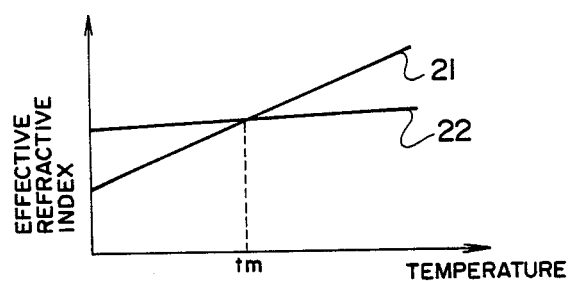
FIG. 4 illustrates phase matching.

In a uniaxial crystal such as $LiNbO_3$, the temperature coefficient C of the refractive index differs between an ordinary ray and an extraordinary ray. In the wave guide, an effective refractive index to a given mode varies with a temperature, as shown in FIG. 4, in which an abscissa represents a temperature of material and an ordinate represents an effective refractive index, and numerals 21 and 22 show changes of refractive index for the ordinary ray and extraordinary ray, respectively. The refractive indices are equal at tm in FIG. 4. When the ω-light and the 2ω-light are selected to correspond to the ordinary light and the extraordinary light, respectively, the effective refractive indices therefor are equal at the temperature tm and the phase matching is attained. In the present invention, a periodic pulse voltage 301 shown in FIG. 5A is applied to the heating electrode 104 to periodically change the temperature in the wave guide along a curve 302 of FIG. 5B. The cooling condition and the application voltage are controlled such that the phase matching temperature tm is between temperatures t1 and t2. As a result, the phase matching is attained each time the curve 302 crosses the temperature tm so that a pulsive and periodic second harmonic output 303 of FIG. 5C is produced. When $t1+t2=2tm$, the second harmonic output is generated at a constant interval. A pulse width and a peak output of the second harmonic output 303 are determined by the thickness of the wave guide, a frequency of change of temperature, an applied voltage and an interaction length.

FIG. 6 shows a second embodiment of the second harmonic light generator of the present invention. In the first embodiment, the temperature is changed in order to periodically change the refractive index of the light propagation area of the optical wave guide. In the present embodiment, an electric field is changed.

Figure 7:
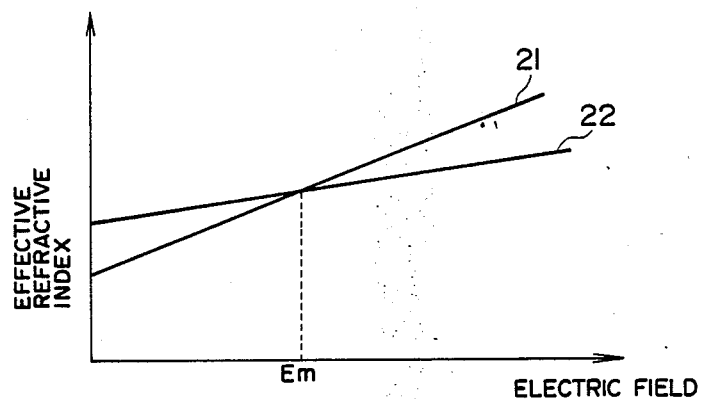
FIG. 7 illustrates phase matching.
Figure 8:
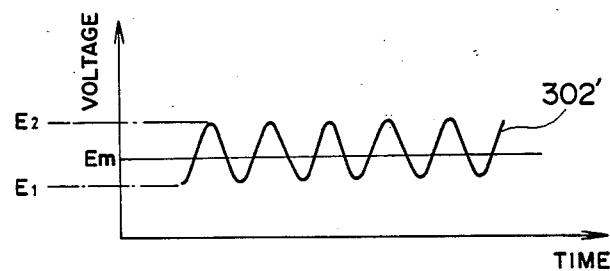
FIG. 8 shows a relationship between time and build-up electric field.

In FIG. 6, the like elements to those shown in FIG. 3 are designated by the like numerals, numerals 404 and 405 denote electrodes for applying a voltage of a polarity shown by an arrow 407. They are connected to a power supply 410. A change of the refractive index n for the ordinary ray and extraordinary ray under an electric field E is given by:

$$\Delta\left(\frac{1}{n^2}\right) = \gamma E \qquad (2)$$

where $\gamma$ is an electro-optical constant which is different between the ordinary ray and the extraordinary ray. Thus, the phase matching is attained at a voltage Em as shown in FIG. 7. A periodic and pulsive voltage shown in FIG. 5A is applied to the electrodes 404 and 405 so that the electric field Em is between electric fields E1 and E2, as shown in FIG. 8. As a result, a periodic and pulsive second harmonic light as shown in FIG. 5C is produced.

The present invention is not limited to the above embodiments but various modifications thereof may be made.

For example, in the above embodiments, the temperature or applied electric field are changed in order to periodically change the refractive index of the light propagation area of the optical wave guide. Any other parameter may be changed to periodically change the refractive index of the light propagation area of the optical wave guide, for example, by applying a mechanical stress to the wave guide or changing an injection current for a semiconductor wave guide. The parameter which can rapidly response to the change of refractive index is preferable from a practical standpoint.

While the curve 302' in FIG. 8 is a sine wave, it may be a square wave depending on the response speed to the electric field.

In accordance with the second harmonic light generator of the present invention, the second harmonic which propagates in the optical wave guide can be efficiently generated without requiring severe parameter control for the optical wave guide.

Since the pulsive second harmonic output is produced, a modulated second harmonic signal can be produced by frequency-modulating or phase-modulating the input voltage. Accordingly, a light modulated signal of a shorter wavelength can be produced, which can be effectively utilized in an optical memory or a light communication.

In the SHG element, when the laser beam is directed to the element as a light source, it must be efficiently coupled to the element. When the laser beam emitted from the light source is directed to the wave guide, the wave guide type SHG element which does not have severe condition to a positional precision in thicknesswise and lateral direcrion of the wave guide is preferable.

To this end, a coupler for directing the light beam from the light source to the wave guide type SHG element is monolithicly formed on the wave guide of the wave gudie type SHG element.

Figure 9:
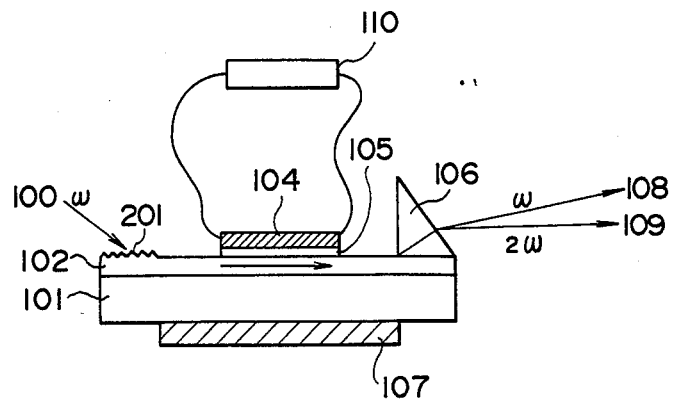
FIG. 9 shows a third embodiment of the second harmonic generator of the present invention.

An embodiment thereof is explained in detail. FIG. 9 shows a third embodiment of the present invention. The like elements to those shown in FIG. 3 are designated by the like numerals and the explanation thereof is omitted. Numeral 101 denotes an optical wave guide made of a non-linear optical crystal such as $LiNbO_3$, numeral 102 denotes a high refractive index layer formed on the non-linear optical crystal 101 by a proton exchange method, numeral 201 denotes a grating coupler, numeral 101 denotes a wave guide which couples the laser beam emitted from a semiconductor laser light source (not shown) to the wave guide 101 by the grating coupler 201. The wave guide 101 need not have the same thickness and width as those of the high refractive index layer 102 in order to enhance the coupling efficiency at the coupler but the length, width and thickness are optimally selected in accordance with the input laser beam.

The grating coupler 201 is formed by forming a periodic unevenness or a refractive index distribution on the wave guide 101.

In the third embodiment, the temperature is periodically changed in order to periodically change the refractive index of the light propagation area of the optical wave guide, as is done in the first embodiment.

The grating coupler 201 may be formed directly on the wave guide 101, or on another layer such as a resist layer bonded to the wave guide. Accordingly, It is monolithic with the SHG element which is integral with the wave guide 101.

The coupling mode of the grating coupler 201 may be controlled by grazing the grating.

A coupler which uses a hologram (holocoupler) may be used to convert a complex wavefront to a desired wavefront.

Figure 10:
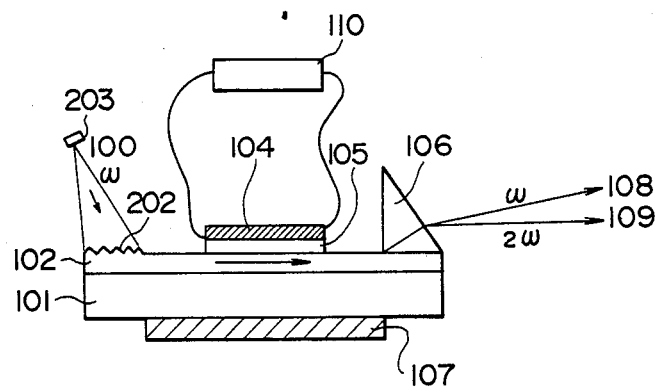
FIG. 10 shows a fourth embodiment of the second harmonic generator of the present invention.

FIG. 10 shows a fourth embodiment of the present invention. It shows an SHG element which uses a holocoupler. The like elements to those shown in FIG. 3 are designated by the like numerals and the explanation thereof is omitted. Numeral 202 denotes a holocoupler, numeral 203 denotes a light source such as an LED, or an optical fiber.

The hologram is basically a record of an interference fringe and primarily converts only in a travel direction of a wavefront. On the other hand, the holocoupler 202 can convert both shape and direction of the wavefront.

A light beam of a diverging spherical wave at a wavelength λ emitted from the LED light source or optical fiber 203 is directed to the holocoupler 202 where it is converted to a wave guide mode plane wave.

In the fourth embodiment, the temperature is periodically changed in order to periodically change the refractive index of the light propagation area of the optical wave guide as is done in the first embodiment.

In the third and fourth embodiments, the SHG element and coupler have gratings to attain monolithic structures.

In those embodiments, the coupling between the incident light beam and the SHG element is facilitated by the length of the grating or holocoupler so that a severe positional precision on the SHG element in the thicknesswise direction of the wave guide (the thickness of the wave guide is approximately 0.4 $\mu$m) can be relieved.

The first embodiment which uses the prism can attain the same effect although the coupler is not monolithic.

As explained above, the coupler such as grating, hologram or prism is formed on the wave guide 101 so that the positional precision of the alignment on the SHG element in the thicknesswise direction of the wave guide 101 can be considerably relieved.

However, since the width of the wave guide 101 is very narrow, for example, several $\mu$m, the positional precision of alignment in the thicknesswise direction of the wave guide 101 is severe.

The alignment precision in the widthwise direction of the wave guide 101 can be relieved by widening the width of the wave guide 101 by a length corresponding to the coupler length. In this case, a condenser lens is arranged in the wave guide behind the coupler so that the light transmitted through the grating coupler is condensed by the condenser lens and directed to the high refractive index layer 102 at a high efficiency.

By monolithicly forming the coupler such as grating or hologram on the wave guide on an extension line from the high refractive index layer 102, the positional precision in the thicknesswise direction of the wave guide can be considerably relieved in coupling the incident light beam. When the prism coupler is used, the same effect is attained although the monolithic structure is not attained. By monolithicly forming the condenser lens in the wave guide behind the coupler, the positional precision in the lateral direction of the wave guide can be considerably relieved.

We claim:

1. An apparatus for periodically generating a second harmonic light comprising:
   a light source, and
   means for converting a fundamental wavelength light emitted from said light source to a second harmonic light, including optical wave guide means having a light propagation area and means for time-periodically varying a refractive index of the light propagation area over a range that includes at least one state which permits phase matching.

2. An apparatus for periodically generating a second harmonic light according to claim 1 wherein said means for time periodically varying the refractive index of said light propagation area time periodically varies a temperature of said light propagation area.

3. An apparatus for periodically generating a second harmonic light according to claim 1 wherein said means for time periodically varying the refractive index of said light propagation area time periodically varies an electric field applied to said light propagation area.

4. An element for converting a fundamental wavelength light to a second harmonic light comprising:
   optical wave guide means having a light propagation area; and
   means for time-periodically varying a refractive index of said light propagation area over a range that includes at least one state which permits phase matching.

5. An element according to claim 4 wherein said means for time periodically varying the refractive index of said light propagation area time periodically varies a temperature of said light propagation area.

6. An element according to claim 4 wherein said means for time periodically varying the refractive index of said light propagation area time periodically varies an electric field applied to said light propagation area.

* * * * *